March 3, 1931. G. C. HOFFMAN 1,794,378
HYDRAULIC TRANSMISSION GEAR
Filed Dec. 12, 1928 4 Sheets-Sheet 1

Inventor
George C. Hoffman
By Faust F. Crampton
Attorney

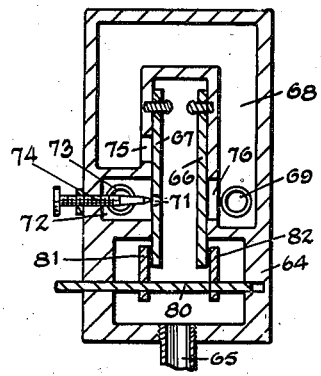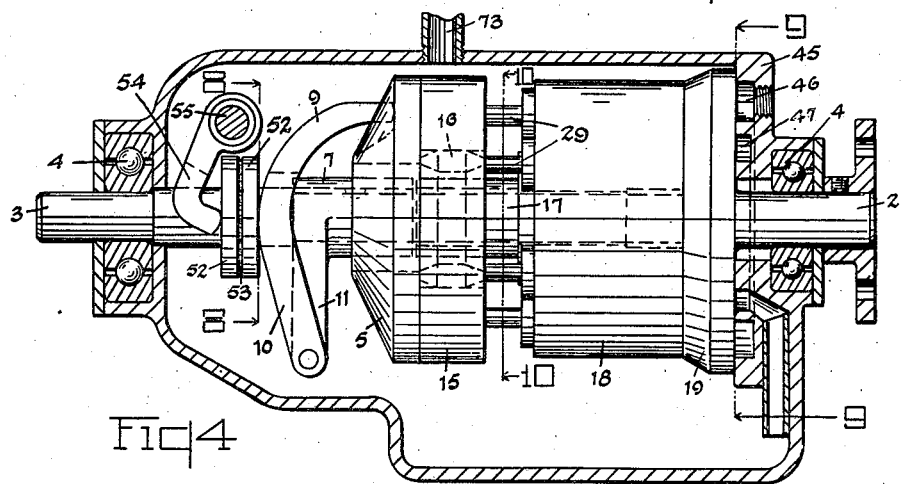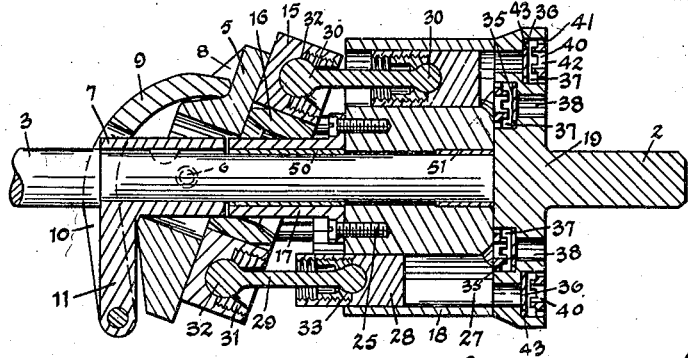

March 3, 1931. G. C. HOFFMAN 1,794,378
HYDRAULIC TRANSMISSION GEAR
Filed Dec. 12, 1928 4 Sheets-Sheet 3

Inventor
George C. Hoffman
By Faust F. Crampton
Attorney

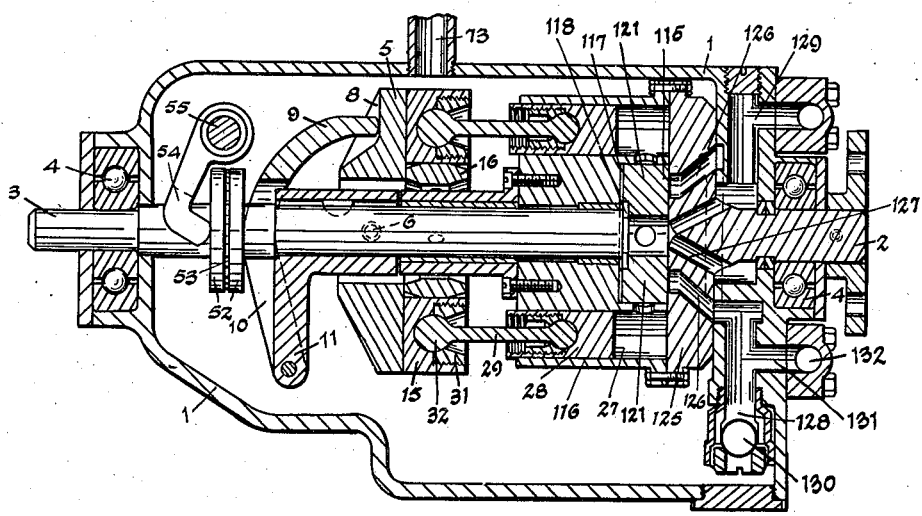

Patented Mar. 3, 1931

1,794,378

UNITED STATES PATENT OFFICE

GEORGE C. HOFFMAN, OF TOLEDO, OHIO

HYDRAULIC TRANSMISSION GEAR

Application filed December 12, 1928. Serial No. 325,560.

My invention has for its object to provide an efficient hydraulic speed transmission gear whereby varying rates of speeds may be obtained between driving and driven shafts of any mechanism. The invention provides a means for producing rates of speed in a driven member under a given load that differ but slightly from each other and thus the invention provides an efficient means for obtaining the exact rate of speed desired under a given load or when a driving member is subjected to a given rotative force.

The invention also particularly provides automatic adaptation of the transmission to the ratio of the rotative force applied to the driving member and the load that is placed on the driven member, as, for example, where the driving member is operated by an internal combustion engine and the driven member is connected to the traction wheels of an automobile and the resistance to the movement of the automobile varies by reason of change in the road condition or change in the grade, the transmission gear will automatically adjust itself to transmit the maximum force producible by the engine to enable the driven member to carry the load at the maximum rate of speed under the condition at which the transmission gear is set and thus maintain the maximum efficiency producible by the engine when the member driven thereby is carrying a variable load.

The invention contains other features and advantages which will appear from the following description and upon examination of the drawings.

The invention may be contained in structures of different forms and may be used for the transmission of power in connection with a great variety of devices that are used for many different purposes and, to illustrate a practical application of the invention, I have selected a hydraulic transmission gear as an example of the various structures in which the invention may be embodied and shall describe it hereinafter. The hydraulic transmission gear selected as an example is illustrated in the accompanying drawings.

Figure 1:
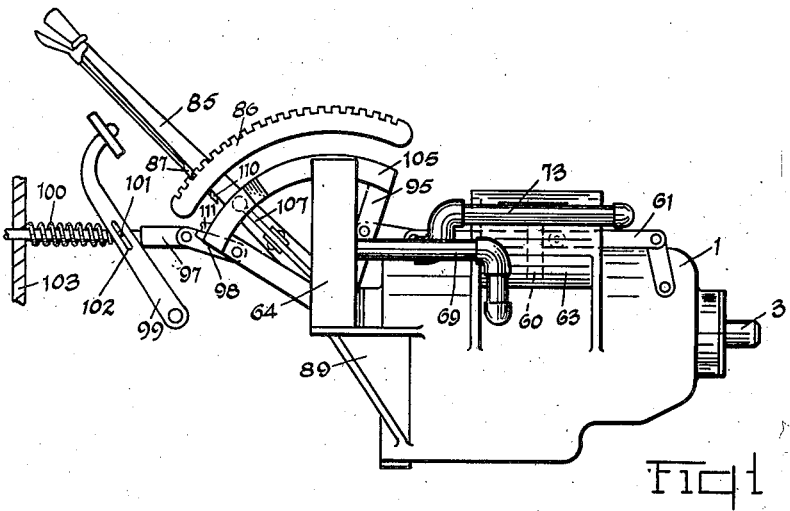
Figure 2:
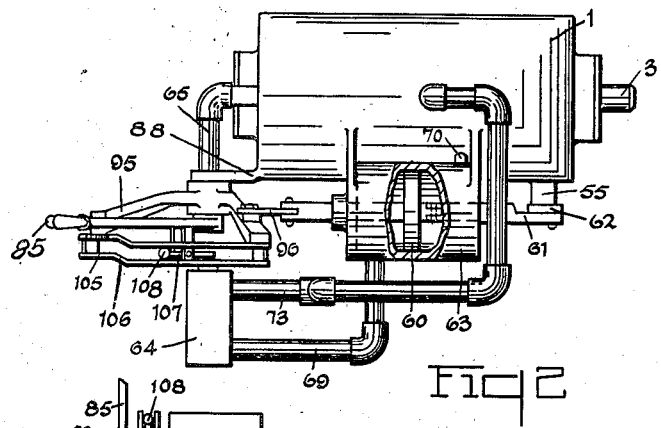
Figure 3:
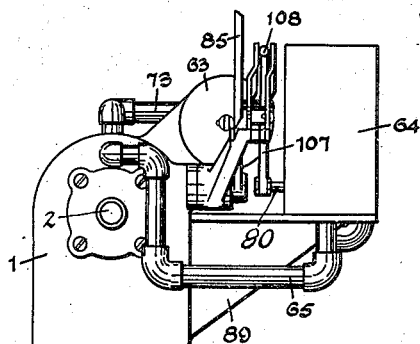
Figure 8:
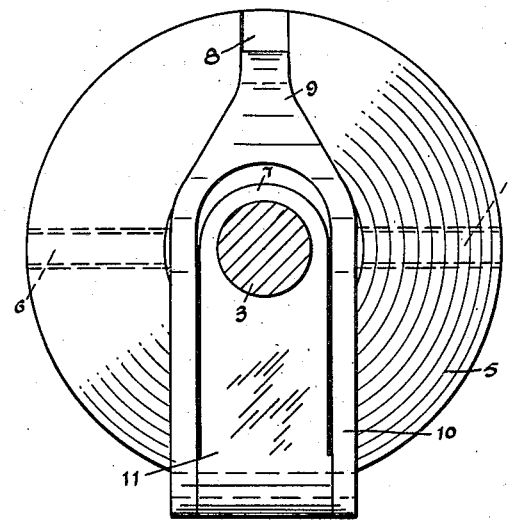
Figure 7:
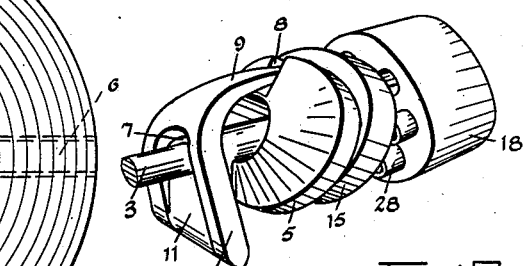
Figure 11:
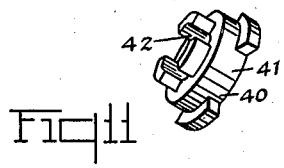
Figure 9:
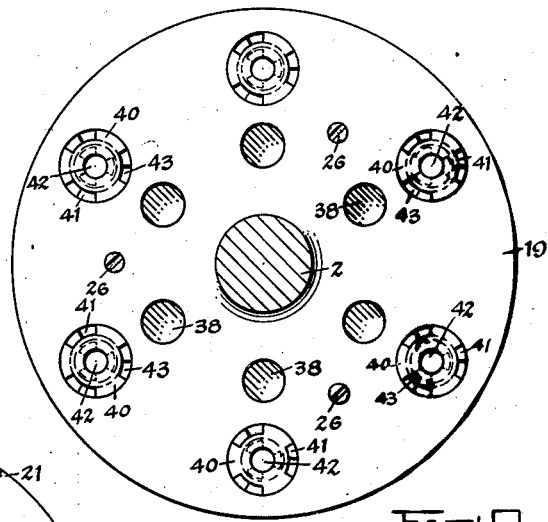
Figure 10:
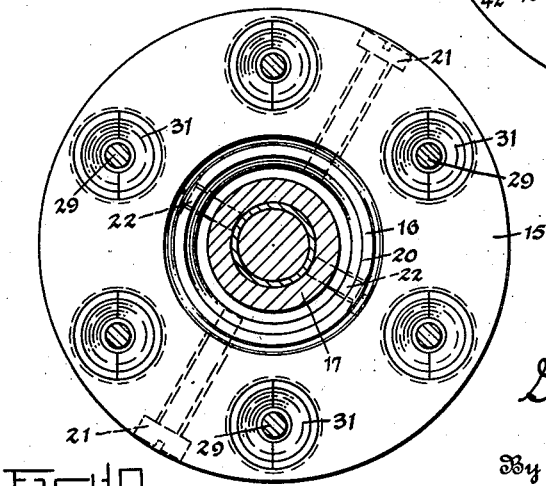

Fig. 1 is a side view of the hydraulic transmission gear referred to. Fig. 2 is a top view of the gear. Fig. 3 is a front view. Fig. 4 is a side view of the power transmitting part of the mechanism and shows the case containing the said part in section. Fig. 5 is a view of a section of the power transmission part shown in Fig. 4. Fig. 6 is a view of a section of a pair of valve controlling members. Fig. 7 is a perspective view of the power transmission part illustrated in Figs. 4 and 5, the dimensions, however, being made about half size. Fig. 8 is a view of a section taken on the plane of the line 8—8 indicated in Fig. 4. Fig. 9 is a view of a section taken on the plane of the line 9—9 indicated in Fig. 4. Fig. 10 is a view of a section taken on the plane of the line 10—10 indicated in Fig. 4. Fig. 11 is a perspective view of one of the valve retainers used for controlling the direction of the flow of the liquid used in the transmission gear. Fig. 12 is a view of a section of a modified form of the power transmission part of the device. Fig. 13 illustrates a side view of a valve member used for controlling the direction of flow of the liquid in the form of power transmission part shown in Fig. 12. Fig. 14 is an edge view of the valve member. Fig. 15 is an end view of the power transmission part shown in Fig. 12.

In the form of construction shown in the figures, the power transmission gear is used for transmitting power from a driving shaft to a driven shaft that are located in axial alignment and rotation of the driving shaft relative to the driven shaft causes the operation of a plurality of pumps at a rate that varies proportionately to the ratio of the rate of rotation of the driving shaft to the driven shaft. The mechanism, however, is such that the rate of movement of a fluid induced by any given ratio in the speeds of rotation of the driving shaft to the driven shaft may be varied at the will of the operator and thus the invention provides for any variation in the speed transmission that may be desired so as to obtain a varying responsiveness of the driven shaft rotative forces applied to the driving shaft as the driven shaft is subjected to variable loads.

The hydraulic transmission gear has a case 1 suitably mounted with reference to an engine or other source of power in order that the shaft 2 may be connected thereto and operate as the driving shaft. The driven shaft 3 is in axial alignment therewith and is connected to the operating parts that are to be controlled by the transmission gear, such as the wheels of an automobile or other elements, depending on the uses to which the transmission gear is put. The shafts 2 and 3 are suitably supported in bearings 4 located within the walls of the case 1.

A disc 5 is pivotally connected to the shaft 3 as by means of the pivot pins 6 that extend through opposite sides of a sleeve 7 which is keyed to the shaft 3. The disc 5 is provided with a recess 8 extending radially and in which is located the end of a finger 9. The finger 9 is located on the end of a bifurcated lever 10 which is pivotally supported on the end of an arm 11 that protrudes from the end of the sleeve 7. Rotation of the shaft 3 thus produces rotative movements of the disc 5, the lever 10 and the arm 11.

The disc 5 is located in contact with an annulus 15 that is connected by means of a universal joint 16 to a sleeve 17 which is connected, through a cylinder block 18 and a valve plate 19, with the driving shaft 2. The universal connection between the annulus 15 and the sleeve 17 is made by the ring 20 located within the annulus 15 and connected in pivotal relation thereto by means of the pins 21. The ring 20 is connected to the sleeve 17 by means of the pins 22 extending in directions that are at right angles to the pins 21. When, therefore, the disc 5, located in contact with the annulus 15, is tilted angularly and the shafts 2 and 3 rotate relative to each other, the outer surface of the annulus 15 will be maintained in the plane of the inner surface of the disc 5 which will cause the annulus 15 to continuously change its angular relation with respect to the axes of the shafts 2 and 3.

The sleeve 17 is secured to the cylinder block 18 by means of suitable screws 25 that extend through a flanged part of the sleeve 17. The cylinder block 18 is secured to the valve plate 19 by means of suitable bolts, such as the bolts 26. The cylinder block 18 is provided with a plurality of bores that form cylinders 27 in which the pistons 28 are located. The pistons 28 are connected by means of links 29 to the annulus 15. In order to interconnect the pistons 28 and the annulus, the links 29 may be provided with round heads 30 located at their ends and suitable split threaded rings 31 may be screwed into recesses 32 formed in the annulus and recesses 33 formed in the pistons. Preferably, the recesses 32 and 33 have hemispherical surfaces at their inner ends and corresponding hemispherical surfaces are formed on the inner sides of the split rings 31 so as to engage the spherical heads 30 of the links 29 to lock the heads 30 in the pistons and to the annulus and permit universal limited angular movements of the links 29 relative to the pistons and the annulus.

The valve plate 19 is provided with an inlet and outlet valve for each cylinder 27. The inlet valves 35 and the outlet valves 36 are located in bores 37 that extend from opposite sides of the valve plate 19. Smaller bores 38 communicate with the bores 37 and complete the passage-way through the plate in connection with each of the bores 37, except as such passage-way is controlled by the valves 35 and 36. The bores 38 being smaller than the bores 37, a seat is formed on the shoulder that is produced for the valves 35 and 36 to close the passage-way. The valves 35 thus permit the influx of a fluid into the cylinders, while the valves 36 prevent such inflow. On the other hand, the valves 36 permit the outflow from the cylinders, while the valves 35 prevent the exhaustion of the contents of the cylinders through the passage-ways controlled thereby. In order to limit the movements of the valves 35 and 36 and maintain them in position so that the current of the fluid through the passage-ways that they control will cause their closure, the bores 37 are provided with stops 40 that fit the outer ends of the bores. The stops 40 are provided with suitable recesses 41 and central openings 42 that permit free flow of the fluid through the stops. Also, the valves 35 and 36 are provided with recesses 43 in their peripheral portions to permit free movement of the fluid about the edges of the valves.

The valve plate 19 is located in contact with the wall 45 of the case 1 wherein is formed a pair of circular channels 46 and 47 that have radii that correspond to the perpendicular distances of the centers of the bores 37 and 38 from the axis of the shaft 2 and so that, as the valve plate 19 is rotated, the passage-ways through the valve plate 19 will communicate at all times with the channels 46 and 47. The arrangement is such that the outlet valves 36 will control the flow of the fluid from the cylinders 27 into the channel 46 while the inflow of the fluid will be from the channel 47 and will be controlled by the valves 35.

The driven shaft 3, which extends through the sleeve 7, the bifurcated lever 10, the disc 5, the annulus 15, and the cylinder block 18, abuts the valve plate 19 at its center and the driving shaft 2 is connected to, or formed integral with, the valve plate 19 and extends from the center of the valve plate 19. The sleeve 17 and the cylinder block 18 may be provided with suitable bearing sleeves 50 and 51 to maintain the shafts 2 and 3 in coaxial relation. Consequently, when the disc 5 is tilted relative to the axis of the shaft 3 and there is a load on the shaft 3, the shaft 3 will drag slightly with respect to the shaft 2 which will cause the annulus 15 to constantly change its angular relation with respect to the axis of the shaft 2 and, consequently, cause the pistons 28 to reciprocate in the cylinders 27, which will produce movement of the fluid through the channels 46 and 47 and through the cylinders 27. The speed of rotation of the shaft 3, maintained by the rotation of the shaft 2, will thus depend upon the resistance to the movements of the pistons produced by the resistance to movements of the fluid produced by the restrictions of the passage-ways for the fluid. In order to vary the position of the disc 5 and, consequently, to vary the degree of the angular movements induced in the annulus 15, a pair of rings 52 is located on the shaft 3. Preferably, a thrust bearing 53 is located intermediate the rings 52 in order to permit free rotation of the rings, one relative to the other. A bifurcated arm 54 is connected to a shaft 55. The end of the arm 54 straddles the shaft 3 and is adapted to engage one of the rings 52 to press the other of the rings 52 against the lever 10. The lever 10 is, preferably, rounded at the point of contact of one of the rings 52 therewith to reduce the sliding movements at the points of contact between one of the rings 52 and the lever 10. Pressure of the arm 54 through the rings 52 operates the lever 10 and causes the finger 9 to tilt the disc 5 relative to the sleeve 7, which is keyed to the shaft 3.

The shaft 55 and, consequently, the arm 54, may be operated by any suitable mechanism. In the form of construction shown, the shaft 55 is operated by means of a piston 60 which is connected by means of a piston rod 61 to an arm 62 that is connected to the shaft 55 so that, when the piston 60 is moved within its cylinder 63, the shaft 55 will be rotated. The piston 60 is operated, preferably, by the pressure of the fluid that is created by the pistons 28 as controlled by valves located in the valve box 64. The fluid used in the transmission gear is preferably oil, which operates not only as a pressure transmission device, but also to lubricate the parts of the transmission gear. The oil is forced by the operation of the pistons 28 through the valves 36 into the channel 46 which communicates, by means of the pipe 65, with the valve box 64 and the movement of the oil through the valve box is controlled by the valves 66 and 67. The pressure of the oil created by the movement of the pistons 28 operates to close the valves 66 and 67. When the valve 66 is mechanically opened, the oil flows into a chamber 68 and thence through a pipe 69 to one side of the piston 60, which moves the piston outward to cause the rotation of the shaft 55 and consequent angular movements of the arm 54, the lever 10, and the disc 5, which increases the length of the stroke of the pistons 28 in the cylinder block 18. This pressure is maintained until the piston 60 is returned towards the end having the inlet through the pipe 69. The pressure within the cylinder 63 is static in character, there being no outward movement of the oil through the cylinder. The end, other than the one to which the pipe 69 is connected, may be open or, preferably, it is connected to the case 1 which not only forms a container for the parts that transmit the power from the driving shaft to the driven shaft, but also forms a reservoir for the oil. This connection may be made at 70 which will return any oil to the case 1 that may leak by the piston 60.

The movement of the oil through the valve box 64 is restricted by means of an opening 71 formed in the valve 67 that communicates with a small chamber 72 to which is connected the pipe 73. The restriction through the opening 71 may be varied by the needle valve 74. The pipe 73 is connected to the top of the case 1 and returns the oil that passes through the small opening 71 to the case. When the piston 60 has reached the position to bring the disc 5 and the annulus 15 to the desired angle, the valve 66 is automatically closed. Assuming that there is no leakage in the chamber 68 of the valve cage 64 and in the cylinder 63, the oil contained therein is in a static condition. However, through the restriction 71 a small quantity of oil continuously flows into the chamber 72 to which is connected the pipe 73. Should there be leakage beyond the valve 66, the mechanism causes the valve 66 to open sufficiently to compensate for this leakage as described hereinafter.

In order to permit the disc 5 to return to a position perpendicular to the axis of the shaft 3, the valve 67 is opened which short circuits the pressure in the pipe 69 and the cylinder 63 and the piston 60 may be readily withdrawn, as by a spring or other suitable means, or it is released from the pressure created by the working pistons 28 which causes the disc 5 and the annulus 15 to automatically take positions in planes at right angles to the axes of the shafts 2 and 3, the oil within the piston 60 being forced through the pipe 69 back into the valve box into the chamber 68 and through an opening 75 located in the wall of the chamber 68 at a point that is covered by the valve 67. Inasmuch as the valve 67 is lifted from one of the walls of the valve box 64, the oil that passes through the opening 75 enters the chamber 72 and passes out through the pipe 73 to the case 1.

The valves 66 and 67 are made in the form of plates that cover the opening 76 formed in one wall of the chamber 68 and the opening 75 formed in another wall of the chamber 68, and also the chamber 72. The valves may be operated by any suitable means. In the form of construction shown, a reciprocable rod 80 is slidably supported in the valve box 64, it being provided with protruding fingers or lugs 81 and 82 that engage the ends of the plates or valves 66 and 67 to produce angular movements of the valves to permit the oil to pass through the ports controlled by the valves.

In order to regulate the position of the disc 5 to vary the rate of rotation of the driven shaft 3 with reference to a given rotation of the driving shaft 2, I have provided an adjustable means that automatically maintains this relative speed of rotation. The adjustable automatic means for thus controlling the speed of the driven shaft 3 has a lever 85 that moves beside an arcuate notched bar or rack 86 and is provided with a spring pressed dog 87, of the type commonly used in connection with lever locking mechanisms, for securing the lever 85 in any position along the rack 86, the lever 85 being pivoted at the arcuate center of the rack 86. The rod 80 is, preferably, located in the axis of rotation of the lever 85 and is also preferably supported for substantially the same angular rotations that are producible by the lever 85 within the length of the arcuate rack 86. The lever 85 may be pivotally supported on an extension 88 of the wall of the case 1 and the valve box 64 may be supported on a bracket 89 that may be connected to the wall of the case. A sector 95 is also pivotally supported on the extension 88 of the wall of the case 1. The parts of the sector are so located as to surround the lever 85 and, consequently, movements of the sector 95 are limited by the position of the lever 85 and the sector may be moved by the lever near the limits of the stroke of the lever as determined by the rack 86. The sector 95 is connected to the piston 60 by means of the piston rod 61 which extends through the end wall of the cylinder 63 and by means of the link 96 and, consequently, the sector 95 is shifted by the operation of the piston 60. The sector 95 may be also connected to a rod 97 through a link 98. The rod 97 may be actuated by a suitable lever, such as a foot lever 99, in one direction, and by a spring 100 in the opposite direction. The spring 100 is located intermediate a point on the rod 97 and a fixed point of the frame of the machine, such as indicated by the wall 103. If desired, the pedal 99 may be connected by means of a pin 101 located in a slot 102 and the spring 100 may be located intermediate the wall 103 and the pedal lever 99. Thus, by reason of the slight leakage of the oil through the restriction 71, the sector 95 may be slowly operated by the pedal lever 99 or by the spring 100.

The position of the disc 5, being dependent upon the operation of the piston 60 which is controlled by the valves 66 and 67, is made subject to the movement or to the relative location of the sector 95. The sector 95 has a channel or a pair of cam surfaces that may be formed of a pair of arcuate strips 105 having bent portions at 106 to cause the angular movement of a lever 107 which is pivotally connected to the lever 85 and extends into the space formed between the strips 105. Preferably, the outer end of the lever 107 has a knob 108 that substantially fits between the strips 105, while the other end of the lever 107 is connected by a ball joint to the rod 80 and, consequently, when the lever 85 is shifted along the rack 86, it carries with it the lever 107 which rotates on the axis of the rod 80 and, as the knob 108 passes the bent portions 106, of the strips 105, the knob 108 is shifted laterally and the lever 107 draws the rod 80 outwardly with respect to the box 64 or pushes the rod inwardly. Depending on the direction of the longitudinal movements of the rod 80, one or the other of the valves 66 and 67 is operated. The bent portions 106 that thus cause the longitudinal movements of the rod 80 are located near the ends of the strips 105 remote from that side of the sector 95 which is connected to the piston 60 and, when the knob 108 is located at that end of the strips and beyond the bent portions 106, the rod 80 operates to open the valve 67. When, however, the knob 108 is located between the bent portions of each of the strips 105, both of the valves 66 and 67 are closed.

Assuming that a connection has been made between the thing to be driven and the driven shaft 3 to cause rotation or movement of the driven thing in the desired direction, such as the driving wheels of an automobile, or traction wheels of a tractor, the lever 85 is moved to a desired notch in the rack 86 to produce the desired rate of rotation of the shaft 3. When this is done, the rod 80 is shifted to open the valve 66 and, the pedal lever 99, being released, the spring 100 moves the piston 60 and the sector 95 a short distance, sufficient to establish a slight angular movement of the disc 5, which causes the pistons 28 to make short strokes. The pressure created by the pistons 28 immediately builds up and is transmitted through the pipe 65, the valve box 64 to the cylinder 63, which further operates the piston 60 and further tilts the disc 5. As the piston 60 moves, the sector 95 is moved and when the bent portions 106 of each of the strips 105 are located on opposite sides of the knob 108, the valve 66 will be closed and the machine will continue to operate under the pressure created by the pistons 28. However, should there be leakage past the piston 60, piston 60 and sector 95 would move forward, that is, to the left, referring to Fig. 1. In so doing, the knob 108 of the lever 107 would be moved laterally away from case 1, opening valve 66 to replace oil lost in cylinder 63. Thus the piston 60 would be again returned to its original position.

Inasmuch as the rod 80 is located in the axis of rotation of the hand lever 85 and the sector 95, any angular displacement of these parts will not, in itself, produce movement of the rod 80. The lateral displacement of the knob 108 is actuated by coming in contact with the bent portions 106 of the strips 105 and moves the rod 80. For this reason the hand lever 85 or the sector 95 can produce movement of the rod 80 only in the event that their movements will cause the knob 108 of the lever 107 to travel along the bent portions 106 of the strips 105.

Under operating conditions an oil pressure exists on the piston 60 sufficient to counteract the force in the rod 61 produced by the action of the pistons 28 against the inclined disc 5. Should there be any leakage past the piston 60, the oil pressure would be reduced which would tend to cause the piston 60 and the strips 105 to move forward or to the left, referring to Fig. 1. In doing this, the knob 108, which had its position midway in the bent portion 106 of the strips 105, would follow the angle of the bent portion 106. In consequence, the knob 108 through the lever 107 and the rod 80 would open the valve 66. Sufficient oil would again flow into the cylinder 63, the piston 60 would move towards the right (Fig. 1) and the strips 105 would follow until the knob 108 reached that point on the bent portion 106 at which the valve 66 would close. Since the position of the hand lever 85 and the knob 108 was not changed, the piston 60 will return to its previous setting.

When, therefore, the lever 85 is moved to any point within the length of the rack 86, the sector 95 is automatically shifted by the operation of the piston 60 through the control of the valves 66 and 67 to a point, such as to locate the knob 108 intermediate the bent portions 106 of each of the strips 105. When the movement of the lever 85 is reversed, that is, swung to the left when viewed from the side of the mechanism shown in Fig. 1, the knob 108 will be immediately carried between the portions of the strip 105, located on that side of the sector more remote from the piston 60, with the result that the valve 67 will be opened which operates to short circuit the pressure into the pipe 69 and the cylinder 63 and release the oil through the pipe 73 to the case 1. Thus, the sector 95 will be carried forward by the lever 85 by reason of the contact of the lever against one of the sides of the sector, while the knob 108 will remain at the forward end of the sector.

The reaction of the pumps formed by the pistons 28, the cylinders 27, and the valves 35 and 36, is to locate the face of the disc 5 in a plane at right angles to the axis of the shaft 3 which results in the movement of the piston 60, and the sector 95 to the limit of its forward movement, such forward movement being determined by the position of the lever 85. In the form of construction shown, the dog 87 is so formed as to have a part 110 that is located so as to engage a raised portion or lug 111 formed on or located on the forward end of the sector 95. The height of the lug 111 and the location of the part 110 of the dog 87 is such as to raise the dog 87 clear of the rack 86. When the sector 95 is located in a position remote from the forward end of the sector 86, the dog 87 on the lever 85 may be raised and the lever 85 moved forward to engage the forward end of the sector, whereupon the part 110 of the dog 87 may be allowed to ride on the lug 111. This will cause the sector 95 and the lever 85 to be moved along the rack 86 to the forward end of the rack by the reactive forces exerted by the annulus 15 against the face of the disc 5 and the face of the disc 5 approaches a plane located at right angles to the axis of the shaft 3. When it is desired to again transmit power from the shaft 2 to the shaft 3, the dog 87 is released from the lug 111 and the lever 85 swung along the rack 86 to the desired point which, as described above, will cause the piston 60 to adjust the angular location of the disc 5.

In the form of construction shown in Fig. 12, the power transmission parts, located in the case 1, are substantially the same as those shown in Figs. 4 and 5. The structure shown in Fig. 12, however, is provided with a single valve member 115 for controlling the flow of the oil to and from the cylinders 27. The cylinder block 116 has a recess 117 in which the valve member 115 is located. The valve member 115 is keyed to the driven shaft 3 by means of the pin 118 and, consequently, it maintains a definite position with reference to the disc 5. The valve member 115 has a pair of chambers 120 and 120' that are separated by a wall 121 that extends laterally in a plane at right angles to the axes of the pins 6 that pivotally support the disc 5 on the sleeve 7. One of the chambers 120' communicates with an opening 122 formed in the center of the valve member 115, while the other chamber 120 is provided with an oblong arcuate opening 123. Inasmuch as the valve member 115 is fixed in its relation to the shaft 3 and the disc 5 rotates with the shaft 3 except for its angular movement about the pins 6 and the separating wall 121 is located in the plane at right angles to the pins 6, the exhaust of the fluid from the cylinders 27 will always take place on one side of the wall 121 since it is that portion, namely, the upper portion of the disc 5 when in the position shown in Figs. 5 and 12, that is tilted towards the axis of the shaft 3 and, as the annulus 15 and the disc 5 are rotated, one relative to the other, the annulus will be depressed as portions thereof move over one-half of the disc 5 separated from the other half by a plane at right angles to the axes of the pins 6. As the annulus 15 is forced towards the cylinder block 116, the oil will be exhausted from the cylinders through the chamber 120' and through the central opening 122, while the intake of the oil on the other side of the wall 121 will be through the oblong opening 123. The plate 125 that forms the head of the cylinders 27 is provided with openings 126 and 127 that communicate with passage-ways that lead one to the bottom of the case 1 and the other to the valve box 64. The passage-way 128 leads to the bottom of the case 1 and operates to draw the oil from the case, while the passage-way 129 leads to the pipe 65. As the valve member 115 is rotated with the shaft 3, the upper chamber 120', which is in communication with the passage-way 122, maintains its connection with the passage-way 127 while the lower chamber 120 and the arcuate groove 123 is always in communication with the passage-way 126. The chambers 120 and 120' alternately communicate to charge and exhaust the cylinders. The oil flows through the chamber 120', through the central opening 122 and the passageway 127. The oil also travels through the chamber 120 and arcuate groove 123 into passageways 126 which communicate with the inlet 128 and are sufficient in number to maintain this communication at all times.

When, therefore, the driven shaft rotates faster than the driving shaft, as, for example, where an automobile by its momentum causes the driven shaft to move faster than the engine shaft, there is a reversal of the pumping operation in the cylinders of the block 116. This reverse operation would ordinarily cause the oil to be quickly pumped out of the cylinder 63 and into the bottom of the case 1. In order to prevent this counterflow of oil, a valve 130 is located in the passage-way 128 which opens only when the oil passes from the bottom of the case 1 into the system through the passage-way 128 but which closes when a reverse pressure is created by the speed of the driven shaft increasing, to such a degree, as to rotate faster than the driving shaft. The out-flow from the passage-way 128 will be through the passage-way 131 and the pipe 132. The oil then passes by a valve 133 into the pipe 65 which leads to the cylinder 63. Draft of the oil from the pipe 65 which communicates with the passage-way 129 is prevented by means of the valve 134. The intake into the cylinder block 116 being through the passage-way 129, under the assumed relative rates of rotation of the driving and driven shafts, and, consequently, the oil is drawn through the pipe 135 which communicates with the sump of the case 1. This passage-way, however, is controlled by the valve 136 which prevents the return flow of the oil from the passage-way 129 when the driving shaft is moving faster than the driven shaft. The ball valves 133, 134, and 136, thus operate to control the direction of flow of the oil from the passage-ways 128 and 129 and prevent the drawing of the oil from the cylinder 63. Thus, change of the position of the sector 95, by reason of the change in the direction of the pumping action of the transmission parts of the oil, is prevented.

Assuming that there is no opening between the pressure or oil delivery side in the valve cage 64 and the space 72 connected to the case 1, under this condition there can be no escape for the oil under compression in the cylinder 18, no displacement of the pistons 28 and no slippage between the disc 5 and the annulus 15 with the result that the driven shaft 3 will turn at the same speed as the driving shaft 2, viz. a one to one ratio, regardless of the angle, except 90°, which the disc 5 makes with the shaft 3.

To produce a ratio between the driving shaft 2 and the driven shaft 3, it will be necessary to provide some means of raising to different degrees, the valve 67, or its equivalent. This would allow some of the oil to be by-passed through the pipe 73. The pistons 28 would then be permitted to move and a slippage between the disc 5 and the annulus 15 would follow. The value of the ratio between the driving and driven ends would be determined by both the opening of the valve 67 and the angle of the annulus 15 with the shaft 3.

The device can be made, as just explained, but the arrangement, as shown in Fig. 6, is preferable. Disregarding the function of the needle valve 74, which will be described hereinafter, and considering only the purpose of the opening 71 in the valve 67, and assuming that the opening 71 in the valve 67 will pass 1000 cubic inches of liquid under a definite pressure and that the maximum displacement of the pistons 28 is 10 cubic inches, then in one minute of time the driven shaft 3 will lose 100 revolutions. At one-half the stroke or 5 cubic inches displacement, 200 revolutions will be lost and so down, for instance, to $\frac{1}{16}$ stroke or $\frac{1}{16}$ of maximum displacement when 1600 revolutions will be lost. Under this assumed condition, there is a difference of 1500 revolutions, and this without any change of speed of the driving shaft 2. Instead of elimination of the opening 71 and substituting a mechanism to move the valve 67, or an additional valve, off its seat for by-passing, as explained above, the opening 71 provides for simplification of the design.

The needle valve 74 is used for the purpose of decreasing or increasing the size of the opening 71 in the valve 67 or its equivalent. The results attained by this can best be demonstrated by assuming that the opening 71 has been decreased to such a size as to permit only 100 cubic inches of liquid to pass through it under the same condition as for the 1000 cubic inch opening. By the same method of figuring, at full stroke only 10 revolutions are lost by the driven end and at $\frac{1}{16}$ stroke 160 revolutions are lost. This is a difference of only 150 revolutions. When the opening discharges 1000 cubic inches, there is a difference of 1500 revolutions.

This comparison indicates the function of the needle valve 74. For example, a high speed truck could, by merely changing the position of the valve 74, be used economically for hard pull and slow speeds. It also allows the same transmission to be used under a variety of conditions which could not be done with a standard transmission with fixed speed ratios.

I claim:

1. In a hydraulic transmission gear, a driving shaft, a driven shaft, a pair of members, one connected to the driving shaft and the other connected to the driven shaft, means for changing the angular relation of one of the members relative to its shaft and operating to continuously change the angular relation of the other of the members to the axis of its shaft, a plurality of pistons connected to the last named member, pumping cylinders located parallel to the axis of the shaft to which the said second named member is connected, and means for restricting the flow of the fluid in said cylinders for maintaining a driving connection between the shafts through the contact of the said members.

2. In a hydraulic transmission gear, a driving shaft, a cylinder block having a plurality of cylinders and connected to the driving shaft, an annulus having a universal connection with the driving shaft, a plurality of pistons located in the cylinders and connected to the annulus, a driven shaft, a disc swiveled on the driven shaft and adapted to make contact with the face of the annulus, and means for tilting the disc relative to the driven shaft to vary the angular relation of the annulus to the driven shaft according to the ratio of the speed of the driving shaft to the driven shaft.

3. In a hydraulic transmission gear, a driving shaft, a cylinder block having a plurality of cylinders and connected to the shaft, an annulus having a universal connection with the driving shaft, a plurality of pistons located in the cylinders and connected to the annulus, a driven shaft, a disc swiveled on the driven shaft and adapted to make contact with the face of the annulus, means for tilting the disc relative to the driven shaft to vary the angular relation of the annulus to the driven shaft according to the ratio of the speed of the driving shaft to the driven shaft, a reservoir of oil connected to the cylinders, and means for restricting the flow of oil through the cylinders.

4. In a hydraulic transmission gear, a source of supply of oil, a driving shaft and a driven shaft, a plurality of pumps connected to the source of supply and operated by the shafts, means for causing the movement of the oil by the pumps according to the ratio of the speeds of rotation of the driving shaft to the driven shaft, a cylinder, a piston located in the cylinder, a pair of valves for controlling the flow of the oil from the pumps to the cylinder, a passage-way for short circuiting the pressure created on the piston, and a lever for operating the valves to connect the pumps with the passage-way or the cylinder.

5. In a hydraulic transmission gear, a source of supply of oil, a driving shaft and a driven shaft, a plurality of pumps connected to the source of supply and operated by the shafts, means for causing the movement of the oil by the pumps according to the ratio of the speeds of rotation of the driving shaft to the driven shaft, a cylinder, a piston located in the cylinder, a pair of valves for controlling the flow of the oil from the pumps to the cylinder, a passage-way for short circuiting the pressure created on the piston, a lever for operating the valves to connect the pumps with the passage-way or the cylinder, a member for operating the said lever and connected to the said piston to maintain one or the other of the valves open until the member is moved to a predetermined position relative to the said lever by the said piston.

6. In a hydraulic transmission, a source of supply of oil, a plurality of pumps, means for restricting the flow of the oil through the pumps according to the ratio of the speeds of the driving and driven shafts, a cylinder, a piston located in the cylinder for varying the stroke of the said pumps, a pair of valves for connecting the pumps to the cylinder and for short circuiting the cylinder, a member for actuating the said valves, a cam for operating the said member and connected to the said piston, means for adjusting the said member relative to the cam for maintaining one or the other of the valves open until the cam member is located in a predetermined relation to the said member.

7. In a hydraulic transmission gear, a driving shaft, a cylinder block connected to the driving shaft and having a plurality of cylinders, a plurality of pistons located in the cylinders, an annulus connected for universal movements to the driving shaft, a driven shaft, a disc connected to the driven shaft for swivel movements of the disc relative to the driven shaft, a cylinder connected with the outlet of the said cylinders, a piston located in the said last named cylinder, a passageway for short circuiting the said last named cylinder, a pair of valves for controlling the flow of fluid from the first named cylinders to either the last named cylinder or through the passageway, a member for operating the said valves to open one or the other of the said valves, a cam for operating the said member and connected to the said last named piston, means for locating the said member relative to the said cam for controlling the opening and closing periods of the said valves relative to the location of the last named piston in its cylinder, and means interconnecting the last named piston with the said disc for varying the stroke of the first named pistons.

8. In a hydraulic transmission gear, a source of supply of oil, a driving shaft and a driven shaft, a plurality of pumps connected to the source of supply and operated by the shafts, means for causing the movement of the oil by the pumps according to the ratio of the speeds of rotation of the driving shaft to the driven shaft, a cylinder, a piston located in the cylinder, a pair of valves for controlling the flow of the oil from the pumps to the cylinder, a passageway for short circuiting the pressure created on the piston, and a means for operating the valves to connect the pumps with the passageway or the cylinder.

In witness whereof I have hereunto signed my name to this specification.

GEORGE C. HOFFMAN.